United States Patent Office 2,831,820
Patented Apr. 22, 1958

2,831,820
FOAMED EPOXY RESIN COMPOSITION AND METHOD OF MAKING

Arnold S. Aase and Luther L. Bolstad, Minneapolis, Minn., assignors to Minneapolis-Honeywell Regulator Company, Minneapolis, Minn., a corporation of Delaware No Drawing. Application April 13, 1953
Serial No. 348,558

13 Claims. (Cl. 260—2.5)

This invention relates to foamed resin-contining compositions including epoxy ether condensation polymers having the following structure

CH$_2$—CH—CH$_2$—(—O—R—O—CH$_2$—CHOH—CH$_2$—)$_x$—O—R—O—CH$_2$—CHCH$_2$ wherein $x$ stands for a number (such as 1, 2, 3, etc.) and R stands for the hydrocarbon radical of a dihydric phenol such as bis-(4-hydroxyphenyl)-2,2-propane ("bis-phenol A"). Epoxy ether resins made by condensing epichlorohydrin and bis-(4-hydroxyphenyl)-2,2-propane (hereinafter referred to as "bis-phenol") are available commercially.

It is an object of the present invention to provide an improved heat-curable uni-cellular resin foam composition which is extremely tough, durable and resilient, having good electrical and mechanical properties, and having voids which are of a uniform size and which are uniformly distributed throughout the foamed material.

It is a further object of the present invention to provide an improved resin foam composition which is especially adapted for use as a potting material in either very large or very small containers. A potting material is used generally to fill interstices in a container which may house a plurality of individual components; for example, an electrical device enclosed in an individual container and including a plurality of small and often very delicate components. After potting, the orientation of the components is fixed and there is consequently less danger of their becoming disorganized, and thereby possibly causing improper operation or destruction of the device. A resin foam of our invention is adaptable for use as a "foam-in-place" resin, that is, the reaction products are introduced into the container and the foaming accomplished therein.

It is an additional object of the present invention to provide a foam potting material which has improved surface wetting qualities, this material being especially adaptable for filling each of the interstices in the unit which is to be potted, including even the extremely small interstices which are sometimes found in small and delicate devices.

It is still another object of the present invention to provide foam composition which has a controllable expansion and cure rate and which is extremely stable after foaming. This foam will not "fall" after initial expansion; "fall" is a phenomena which is sometimes designated "post expansion shrinkage."

It is still a further object of the invention to provide a potting material which has good surface adhesion properties, and which has a uniform rate of cure, therefore, an orientation of the constituent parts of the unit which is to be potted with the material of our invention and will not be disturbed while the resin is being foamed in place.

Other and further objects and features of the present invention will become apparent from the following description and appended claims.

The foam compositions utilized according to the present invention comprise an epoxy resin (made by the reaction of epichlorohydrin and "bis-phenol A") and characterized by having the number designed in the above noted structure formula as $x$ being equal to between 0.3 and 20. It should be noted however, that epoxy resins in question are actually mixtures of compounds falling within the indicated structure, and that the number herein designated $x$ is the average of the individual integral numbers $x$ which characterize each of the compounds included in these mixtures.

As the number $x$ increases, the resins become increasingly viscous. For some operations, a resin of this type is desirable. If desired, for additional ease in handling especially viscous epoxy resins, a diluent may be added to reduce the viscosity of the base resin. A diluent which has been found to be very satisfactory is phenyl glycidyl ether. When such a diluent is desired, it is generally used in relatively small portions with respect to the amount of epoxy resin present. A desirable feature of the diluent is that it be able to form a good, non-fugitive resin. Phenyl-glycidyl ether has this desirable property.

The foam resins of the present invention also comprise an amine hardener which is taken from the class which includes para, para' diamino diphenyl methane, and a polyethylene-polyamine having the formula $$H_2N—(CH_2—CH_2NH—)_y CH_2—CH_2NH_2$$

wherein $y$ is a number ranging from 0 to 3. The use of these hardeners with the above described epoxy base resin is unique in producing a very desirable uni-cellular, foamed or frothed compound.

The constituents of the foam compound and their respective functions are as follows:

| Compound | Function |
|---|---|
| epoxy resin | base resin. |
| amine hardener as hereinbefore defined. | hardener for base resin. |
| primary blowing agent | provides gas for expansion of resin. |
| auxiliary blowing agent | same function as primary blowing agent, but also acts as a heat absorber for exothermic "setting" reaction, and may be a solvent for base resin constituents of the compound. |
| surface active agent | assists production of uniform cell size. |
| foam stabilizer | stabilizes foam after initial expansion, optional in some compositions. |

According to the present invention, these various components are mixed together and the resulting mixtures subjected to an elevated temperature sufficient to cause the primary blowing agent to "blow," thereby foaming or frothing the prepared resin mixture. The blowing of the primary and secondary blowing agents may take place as either a vaporization or a thermal decomposition of the agent. The gas formed by the vaporization or thermal decomposition of the blowing agent or agents causes the remainder of the resin composition to expand and froth. The elevated temperature necessary for the "blowing" also accelerates the reaction between the base resin and the hardener thereby causing the resin to "set" while it is in the foamed or frothed state. In some cases, a foam stabilizer is used to stabilize the expanded foam immediately upon expansion and before the resin has solidified.

The hardeners which we have found to be preferred are para, para' diamino diphenylmethane, and a polyethylenepolyamine having a structural formula

$H_2N-(CH_2-CH_2NH-)_y CH_2-CH_2NH_2$ wherein y represents a number ranging from 0 to 3. The number represented by y is actually an averag of individual numbers of various compounds included in the polyamine mixture. Both compounds are commercially available. Both compounds have active hydrogens on the end of the molecules.

It is the function of the primary blowing agent to provide gas which properly froths the mixture. In accordance with the process disclosed herein, a thermally responsive primary blowing agent is used. This thermal response may be either a thermal decomposition per se, or a vaporization. A further desirable characteristic of the primary blowing agent is that the decomposition be exothermic; however this latter characteristic is not necessary to the process, and endothermically decomposable materials may be utilized satisfactorily. For this purpose, many compounds are satisfactory. Among these are diazo-aminobenzene, dinitroso pentamethylene tetramine, ammonium carbonate, ammonium carbamate, hydrogen peroxide, and p,p'oxybis (benzenesulfonyl hydrazide). The latter material is the subject of Patent No. 2,552,065 to Schoene, and reference is made to this patent for a description of the material and for a method of preparing same. It is interesting to note at this point that, due to the differing decomposition or blowing temperatures of the aforementioned compounds, various operating temperatures must be employed. Operating temperatures which we have found satisfactory for various blowing agents are as follows:

Blowing agent: Temperature, ° F.
  Diazo aminobenzene _____ 200
  Dinitroso pentamethylene tetra-amine _____ 200
  p,p'Oxybis benzenesulfonyl hydrazide _____ 225
  Ammonium carbonate _____ 140
  Naphtha _____ 225

These temperatures are not in themselves critical, and it is understood that there is a range of temperatures within which the reaction will properly proceed provided the temperature is in excess of the decomposition temperature of the material. It will be further understood that various other blowing agents may be used successfully, and there is, therefore, no intention of limiting the scope of the present invention to the specific blowing agents mentioned above.

In some cases, it is necessary to use an auxiliary blowing agent to dissipate heat generated in the exothermic decomposition reaction of the primary blowing agent. An endothermically volatile material is used for this purpose. Among the materials which we have found satisfactory as an auxiliary blowing agent are toluene, naphtha, ethylene chloride, methyl, ethyl, n-propyl and n-butyl alcohols, trichloro ethylene, perchloro-ethylene, low boiling ketones, benzene and xylene. Other compounds having similar physical properties may likewise be successfully employed for this purpose, provided they are compatible with the other constituents.

A foam stabilizer may be included in the mixture for the purpose of "setting" the foam and preventing collapse or "fall" of the foam after initial expansion and before complete hardening of the resin. Among the compounds which we prefer to use are the condensation product formed from the reaction between polyvinyl alcohol and either formaldehyde or acetaldehyde. Such compounds are commercially available, for example, the Shawinigan Chemical Company of New York markets such a material under the trade name "Formvar 15/95E." Compounds which are satisfactory as plasticizers particularly when these compounds are used in this regard are tri-o-cresyl phosphate and dioctylphthalate. These compounds are commercially available. Thus, in practice, a balance must be maintained between the rate of blowing and the setting rate of the resin in order that the resin will not set before the blowing is completed nor, on the other hand, will it "fall" before setting. This balance is aided by the addition of the foam stabilizer since these stabilizers temporarily "set" the foam before it will be able to hold itself in place and while the basic reaction between the base resin and hardener is still in progress.

A more uniform cell size is obtained by the use of a surface active agent. In this connection, we prefer to use a non-ionic type activator, such as polyoxyglycol having the following structure:

$HO-(C_2H_4O)_a-(C_3H_6O)_b-(C_2H_4O)_c-H$ wherein b is equal to at least 15, and wherein the ethylene oxide portion of the molecule comprises from 16 to 80 percent of the molecular weight of the material. Such compounds are commercially available. For example, Wyandotte Chemical Corporation of Wyandotte, Michigan, markets such a compound under the trade name "Pluronics."

In the preferred modification of the present invention, a stock resin is made up which includes the base resin, primary blowing agent, surface active agent, foam stabilizer, and auxiliary blowing agent. This stock resin has a long shelf life, and may be mixed up a reasonable time before use. When the resin is to be used, it is mixed with an amine hardener such as those previously described and the mixture is heated until it is frothed and cured. The constituents of the stock resin may, for example, be mixed according to the proportions set out in Table I below.

TABLE I

| Constituent: | Parts, general range |
|---|---|
| Epoxy resin | 95 |
| Primary blowing agent | 0.1 to 10 |
| Auxiliary blowing agent | 0 to 55 |
| Surface active agent | 0.01 to 2.5 |
| Foam stabilizer | 0 to 15 |

To the above stock resin is added an amine hardener as set forth previously in the ratio of about 2.0 to 20 parts base resin to 1 part hardener.

In order to encapuslate a unit, the unit to be encapsulated is preferably preheated to a temperature of about 250° F., for example. The stock resin set forth in Table I is mixed with a hardener taken from the class consisting of a polyethylene-polyamine, as previously described, and para, para' diamino diphenylmethane; and the mixture placed in the unit. Foaming takes place within 5 to 20 minutes and the unit may be removed from the oven at that time, however, it is generally more desirable to allow the unit to remain in the heating chamber for a longer period of time since a post-expansion cure such as this will enhance the high temperature resistivity of the foam.

The following specific examples illustrate the invention:

*Example I*

| Composition: | Parts |
|---|---|
| Base resin A | 71.25 |
| Hardener (para, para' diamino diphenylmethane) | 17.00 |
| Blowing agent [p,p'-oxybis (benzene sulfonyl hydrazide)] | 0.80 |
| Auxiliary blowing agent (naphtha) | 10.90 |
| Surface active agent (polyoxyglycol) | 0.05 |

The hardener is melted and rapidly mixed with the base resin. To this resin-hardener mixture the other components are added and thoroughly mixed. This mixture is then frothed for a time at a temperature of from 225° F. to 250° F., during which it expands to about 10 times its volume. This produces a foam having a density of approximately 5 pounds per cubic foot and a compressive strength of over 100 pounds per square inch.

*Example II*

The composition of Example I except that the blowing agent used is dinitroso pentamethylene tetra-amine or ammonium carbonate.

*Example III*

Composition: Parts
- Base resin B_____ 66
- Hardener (polyethylene-polyamine)_____ 14
- Blowing agent [para, para' oxybis (benzene sulfonyl hydrazide)]_____ 0.95
- Auxiliary blowing agent (toluene)_____ 13
- Resin modifier (tri-o-cresylphosphate)_____ 6
- Surface active agent (polyoxyglycol)_____ 0.05

The constituents of this composition are thoroughly mixed and heated to a temperature of from 250° F. to 260° F. The resin expands to 6 or 7 times in volume, and produces a foam having a density of from 8 to 9 pounds per cubic foot, and having a compressive strength of approximately 300 pounds per square inch.

*Example IV*

The composition of Example III with the exception of the resin modifier; in this example 6 parts of dioctylphthalate are used in lieu of the tri-cresyl phosphate. This produces a resin which is extremely strong, expanding to about 3 times its original volume. The compressive strength of this foam is in excess of 300 pounds per square inch.

*Example V*

Composition: Parts
- Base resin C_____ 57.00
- Hardener (polyethylene-polyamine)_____ 4.00
- Blowing agent [para, para' (benzenesulfonyl hydrazide)] _____ 0.95
- Auxiliary blowing agent (perchloroethylene)_ 31.00
- Surface active agent (polyoxyglycol)_____ 0.05
- Resin modifier (tri-o-cresylphosphate)_____ 7.00

This mixture is thoroughly mixed and heated to between 300 and 350° F. The material expanded to from 3 to 5 times its original volume, yielding a frothed resin having a compressive strength of about 300 pounds per square inch.

*Example VI*

Composition: Parts
- Base resin D_____ 72.00
- Hardener (polyethylene-polyamine)_____ 18.00
- Blowing agent [para, para' oxybis (benzenesulfonyl hydrazide)]_____ 0.95
- Surface active agent (polyoxyglycol)_____ 0.05
- Auxiliary blowing agent (N-propyl alcohol)_ 5.00
- Resin modifier (condensation product from formaldehyde and polyvinyl alcohol)_____ 4.00

The composition is thoroughly mixed and heated to 225° F. and allowed to froth. A very good foam is produced, having a density of 4 to 5 pounds per cubic foot, and having a compressive strength of about 100 pounds per square inch.

"Epoxy number" is defined as number of epoxy equivalents per 100 grams of base resin. In the foregoing examples, the base resins have the following epoxy numbers: base resin A, about 0.4, base resin B, about 0.2, base resin C, about 0.1, base resin D, about 0.05.

The top practical temperature range of these systems is approximately 350° F. This is due to the fact that some of the materials in the mixture, for example, the epoxy base resin, will char during the reaction if an operating temperature substantially in excess of 350° F. is used. It may be seen, however, that as the blowing temperature is increased, the quantity of auxiliary blowing agent needed is also increased. In Example VI for instance, the operating temperature is in the range of from 300° F. to 350° F. and the relative amount of auxiliary blowing agent is substantially increased over that of the other examples.

In addition to use as a potting material, the composition of the present invention may be satisfactorily used for other purposes, for example electrical insulation. In other uses, the resin may be formed in blocks or sheets and later cut to proper size and shape.

The frothed set resin of the present invention has a density of from 3 to 9 pounds per cubic foot, and has a compressive strength of from 100 to 300 pounds or more per square inch. This resin is white in color and is very tough and durable. This compound is also characterized by its very excellent heat and electrical insulating properties. In addition, this material, because of its surface adhesion properties, tends to follow along all surfaces as it expands and thus completely covers the potted objects without leaving undesired voids. Further, because it has these good surface adhesion properties while still fluid, no undue forces are exerted against the elements being encapsulated.

Although various specific embodiments of the invention herein have been disclosed, it will be understood that there is no intention to limit the scope of the present invention to these specific embodiments alone, since they are used for purposes of illustration only. Many details of composition and procedure may be varied without departing from the principles of this invention. It is therefore intended that the scope of this invention be limited only by the appended claims.

We claim as our invention:

1. A foamable resin composition characterized by stability upon foaming which comprises a base resin, a blowing agent capable of chemically decomposing to form a gas at elevated temperature to foam said resin, said blowing agent being taken from the class consisting of diazo amino benzene, ammonium carbonate, ammonium carbamate, dinitroso pentamethylene tetramine and p,p' oxybis (benzenesulfonyl hydrazide), a hardener for said resin, and a foam stabilizer to prevent collapse of the resin after foaming but before hardening, said base resin having the structural formula

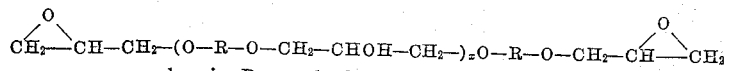

wherein R stands for the hydrocarbon radical of a dihydric phenol and x has a value of between 0.3 and 20, and being prepared as the condensation product of epichlorohydrin and bis-(4-hydroxyphenyl)-2, 2 propane, said hardener being taken from the class consisting of para, para' diamino diphenylmethane, and a compound having the structural formula

wherein $y$ is a number greater than 0 and ranging up to 3, said stabilizer consisting essentially of the anhydrous condensation product of polyvinyl alcohol and an aldehyde containing less than 3 carbon atoms.

2. The foamable resin composition of claim 1 wherein one part of hardener is present for two to twenty parts of resin.

3. The foamable resin composition of claim 1 wherein said stabilizer is present in the amount of one to fifteen parts for each ninety-five parts of base resin.

4. The foamable resin composition of claim 3 wherein said blowing agent is taken from the class consisting of p, p' oxybis (benzenesulfonyl hydrazide), dinitroso pentamethylene tetraamine, diazoamino benzene, and ammonium carbonate.

5. The foamable resin composition of claim 3 wherein said stabilizer is polyvinyl formal.

6. A foamable resin composition characterized by stability upon foaming which comprises a base resin, a blowing agent capable of chemically decomposing to form a gas at elevated temperature to foam from said resin, said blowing agent being taken from the class consisting of diazo amino benzene, ammonium carbonate, ammonium carbamate, dinitroso pentamethylene tetramine and p, p' oxybis (benzenesulfonyl hydrazide), one part of a hardener for two to twenty parts of said base resin, one to fifteen parts of polyvinyl formal stabilizer for each ninety-five parts of resin to prevent collapse of the resin after foaming but before hardening, and a surface active agent, said base resin having the following structural formula

wherein R stands for the hydrocarbon radical of a dihydric phenol and $x$ has a value of between 0.3 and 20, and being prepared as the condensation product of epichlorohydrin and bis-(4-hydroxyphenyl)-2, 2 propane, said hardener being taken from the class consisting of para, para' and diamino diphenylmethane and a compound having the structural formula

wherein $y$ is a number greater than 0 and ranging up to 3, and said surface active agent having the following structural formula

wherein $b$ is equal to at least 17 and wherein the ethylene oxide portion comprises between 16% and 80% of the molecule.

7. A foamable resin composition characterized by stability upon foaming which comprises a base resin, a blowing agent consisting essentially of para, para' oxybis (benzene sulfonyl hydrazide) to foam said resin, a hardener for said resin and a stabilizer to prevent collapse of the resin after foaming but before hardening consisting essentially of polyvinyl formal, said base resin having the following structural formula

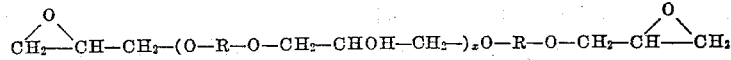

wherein R stands for the hydrocarbon radical of a dihydric phenol and $x$ has a value of between 0.3 and 20, and being prepared as the condensation product of epichlorohydrin and bis-(4-hydroxyphenyl)-2, 2 propane, said hardener being taken from the class consisting of para, para' diamino diphenylmethane and a compound having the structural formula

wherein $y$ is a number greater than 0 and ranging up to 3, a polyoxy glycol surface active agent having the structural formula

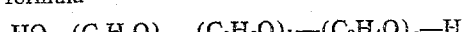

wherein $b$ is equal to at least 17 and wherein the ethylene oxide portion represents from 16% to 80% of the molecular weight of the compound, and an auxiliary blowing agent taken from the class consisting of toluene, butyl alcohol, naphtha, ethylene chloride, perchloroethylene and trichloroethylene, said composition being mixed in the following proportions:

| Constituent: | Parts |
| --- | --- |
| Base resin | 95 |
| Blowing agent | 0.1 to 10 |
| Hardener | 4.5 to 50 |
| Stabilizer | up to 15 |
| Surface active agent | 0.01 to 2.5 |
| Auxiliary blowing agent | up to 55 |

8. A unicellular foamed resin composition comprising a base resin having the structural formula

wherein R stands for the hydrocarbon radical of a dihydric phenol and $x$ has a value of between 0.3 and 20, and being prepared as the condensation product of epichlorohydrin and bis-(4-hydroxyphenyl)-2, 2 propane, a hardener for said resin taken from the group consisting of para, para' diamino diphenylmethane and a compound having the structural formula

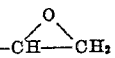

wherein $y$ is a number greater than 0 and ranging up to 3, and a stabilizer for said resin consisting of the anhydrous condensation product of polyvinyl alcohol and an aldehyde having less than 3 carbon atoms.

9. The foamed composition of claim 8 wherein said hardener is present in the amount of one part for two to twenty parts of resin and said stabilizer is present in the amount of one to fifteen parts for ninety-five parts of resin.

10. The foamed composition of claim 9 wherein said stabilizer is polyvinyl formal.

11. The foamed composition of claim 9 wherein said stabilizer is polyvinyl acetal.

12. The method of producing a stable foam resin which comprises preparing a mixture including a base resin, a hardener for said base resin, a stabilizer for said resin and hardener having a setting time substantially less than the setting time of said resin and hardener to prevent collapse of the resin after foaming but before hardening, and a blowing agent taken from the group consisting of diazo amino benzene, ammonium carbonate, ammonium carbamate, dinitroso pentamethylene tetramine and p, p' oxybis (benzenesulfonyl hydrazide), thence subjecting said mixture to a temperature in excess of the decomposition temperature of the blowing agent but not in excess of about 350° F. to foam the resin, said base resin having a structural formula

wherein R represents a hydrocarbon radical of a dihydric phenol and $x$ has a value of between 0.3 and 20, and being prepared as the condensation product of epichlorohydrin and bis-(4-hydroxyphenyl)-2, 2 propane, said hardener being taken from the class consisting of para, para' diamino diphenylmethane and a compound having the structural formula

wherein $y$ represents a number greater than 0 and ranging up to 3, said stabilizer consisting essentially of the anhydrous condensation product of polyvinyl alcohol and an aldehyde containing less than 3 carbon atoms.

13. The method of claim 12 wherein said mixture is subjected to said temperature for a period of about 5 minutes.

References Cited in the file of this patent

UNITED STATES PATENTS

| | | |
|---|---|---|
| 1,981,722 | Ditmar | Nov. 20, 1934 |
| 2,132,969 | Rau | Oct. 11, 1938 |
| 2,446,429 | Nelson et al. | Aug. 3, 1948 |
| 2,506,486 | Bender et al. | May 2, 1950 |
| 2,510,886 | Greenlee | June 6, 1950 |
| 2,552,065 | Schoene | May 8, 1951 |
| 2,582,228 | Brinkema | Jan. 15, 1952 |
| 2,623,023 | Koroly | Dec. 23, 1952 |
| 2,629,698 | Sterling | Feb. 24, 1953 |
| 2,739,134 | Parry et al. | Mar. 20, 1956 |